(12) United States Patent
Parkkinen et al.

(10) Patent No.: US 8,374,548 B2
(45) Date of Patent: Feb. 12, 2013

(54) METHOD FOR CLOSING A COMMUNICATION LINK

(75) Inventors: Jukka Parkkinen, Oulu (FI); Mikko A Hyvärinen, Oulu (FI)

(73) Assignee: Nokia Corporation, Espoo (FI)

( * ) Notice: Subject to any disclaimer, the term of this patent is extended or adjusted under 35 U.S.C. 154(b) by 1342 days.

(21) Appl. No.: 11/312,773

(22) Filed: Dec. 21, 2005

(65) Prior Publication Data

US 2007/0141985 A1 Jun. 21, 2007

(51) Int. Cl.
 *H04B 7/00* (2006.01)
 *H04B 5/00* (2006.01)
 *G05B 11/01* (2006.01)
 *G08C 19/12* (2006.01)

(52) U.S. Cl. .......... 455/41.2; 455/41.1; 340/12.51; 340/13.26

(58) Field of Classification Search .......... 455/420, 455/41.1, 41.2, 436
See application file for complete search history.

(56) References Cited

U.S. PATENT DOCUMENTS

| | | | |
|---|---|---|---|
| 6,892,052 B2 | 5/2005 | Kotola et al. | |
| 7,110,744 B2 * | 9/2006 | Freeny, Jr. | 455/406 |
| 7,343,160 B2 * | 3/2008 | Morton | 455/444 |
| 2002/0004374 A1 | 1/2002 | Kantola et al. | |
| 2002/0198020 A1 * | 12/2002 | Mooney | 455/553 |
| 2003/0017805 A1 | 1/2003 | Yeung et al. | |
| 2003/0151600 A1 * | 8/2003 | Takeuchi et al. | 345/204 |
| 2004/0051393 A1 | 3/2004 | Ratcliffe | |
| 2004/0198425 A1 | 10/2004 | Mellone et al. | |
| 2004/0243519 A1 * | 12/2004 | Perttila et al. | 705/75 |
| 2005/0014468 A1 * | 1/2005 | Salokannel et al. | 455/41.2 |

FOREIGN PATENT DOCUMENTS

| | | |
|---|---|---|
| JP | 2003032261 | 1/2003 |
| JP | 2005094442 | 4/2005 |
| WO | 0163888 A1 | 8/2001 |
| WO | WO 2005/093644 A1 | 10/2005 |

OTHER PUBLICATIONS

Japanese Patent Office Official Action dated Dec. 20, 2010 with English Summary for Japanese Patent Application No. 2008-546661.

* cited by examiner

*Primary Examiner* — Huy C Ho
(74) *Attorney, Agent, or Firm* — Locke Lord LLP

(57) ABSTRACT

A system for controlling the operation of a remote device via wireless communication. The remote device includes resources for communication via at least two different short-range wireless mediums with different operational ranges. The sensing of a scanning communication signal from a first wireless medium may trigger the disconnection of the remote device from an already established connection, through a second wireless communication medium, to the scanning device. The remote device may provide a remote device ID to the scanning device. As a result of this transaction, one or both devices may experience a mode change, which may be signaled by a audible, visual or tactile confirmation to a user.

40 Claims, 9 Drawing Sheets

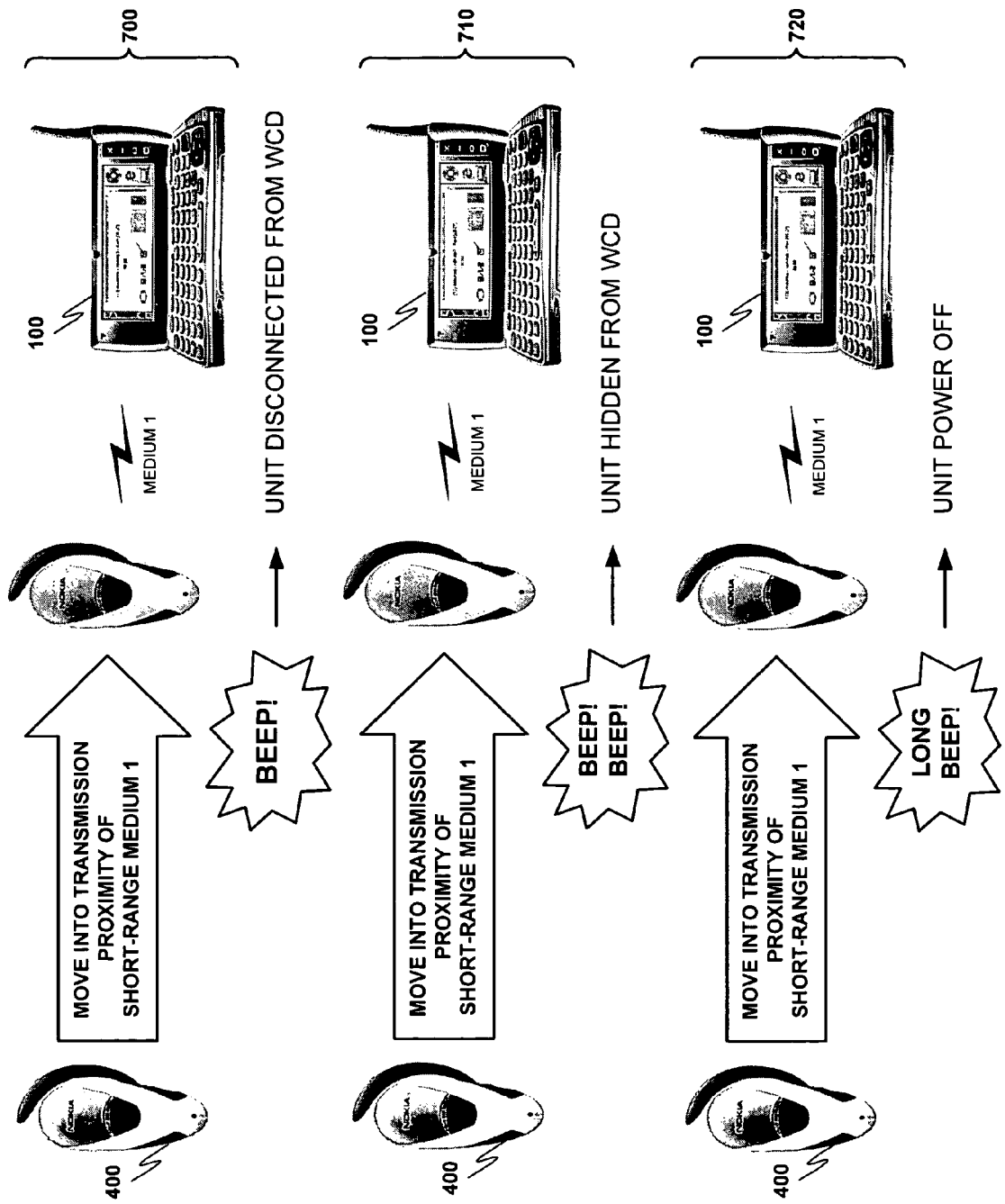

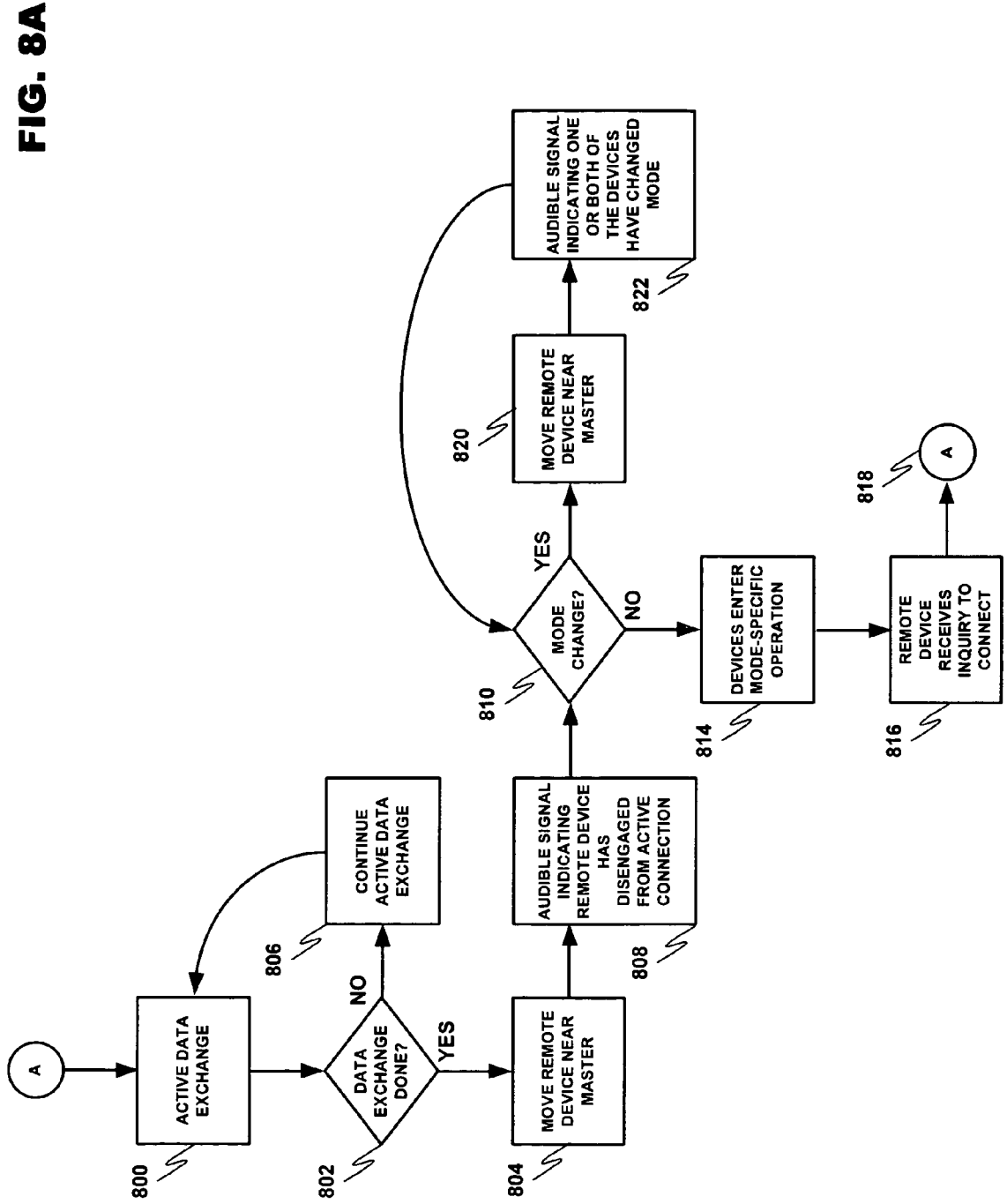

METHOD FOR CLOSING A COMMUNICATION LINK

BACKGROUND OF THE INVENTION

1. Field of Invention

The present invention relates to a system for controlling the operation of remote devices linked by wireless communication, and more specifically, to system of controlling the operation of a remote device wirelessly communicating using a second wireless medium by scanning the remote device with a first wireless medium.

2. Description of Prior Art

Modern society has quickly adopted, and become reliant upon, handheld devices for wireless communication. For example, cellular telephones continue to proliferate in the global marketplace due to technological improvements in both the quality of the communication and the functionality of the devices. These wireless communication devices (WCDs) have become commonplace for both personal and business use, allowing users to transmit and receive voice, text and graphical data from a multitude of geographical locations. The communication networks utilized by these devices span different frequencies and cover different broadcast distances, each having strengths desirable for various applications.

Cellular networks facilitate WCD communication over large geographic areas. These network technologies have commonly been divided by generations, starting in the late 1970s to early 1980s with first generation (1G) analog cellular telephones that provided baseline voice communications, to the now emerging 4G streaming digital video content planned for the 2006-2007 timeframe. GSM is an example of a widely employed 2G digital cellular network communicating in the 900 MHZ-1.8 GHZ band in Europe and at 1.9 GHZ in the United States. This network provides voice communication and also supports the transmission of textual data via the Short Messaging Service (SMS). SMS allows a WCD to transmit and receive text messages of up to 160 characters, while providing data transfer to packet networks, ISDN and POTS users at 9.6 Kbps. The Multimedia Messaging Service (MMS), an enhanced messaging system allowing for the transmission of sound, graphics and video files in addition to simple text, has also become available in certain devices. Soon emerging technologies such as Digital Video Broadcasting for Handheld Devices (DVB-H) will make streaming digital video, and other similar content, available via direct broadcast to a WCD. While long-range communication networks like GSM are a well-accepted means for transmitting and receiving data, due to cost, traffic and legislative concerns, these networks may not be appropriate for all data applications.

Short-range wireless networks provide communication solutions that avoid some of the problems seen in large cellular networks. Bluetooth™ is an example of a short-range wireless technology quickly gaining acceptance in the marketplace. A Bluetooth™ enabled WCD transmits and receives data at a rate of 720 Kbps within a range of 10 meters, and may transmit up to 100 meters with additional power boosting. A user does not actively instigate a Bluetooth™ network. Instead, a plurality of devices within operating range of each other will automatically form a network group called a "piconet". Any device may promote itself to the master of the piconet, allowing it to control data exchanges with up to seven "active" slaves and 255 "parked" slaves. Active slaves exchange data based on the clock timing of the master. Parked slaves monitor a beacon signal in order to stay synchronized with the master, and wait for an active slot to become available. These devices continually switch between various active communication and power saving modes in order to transmit data to other piconet members. In addition to Bluetooth™ other popular short-range wireless networks include WLAN (of which "Wi-Fi" local access points communicating in accordance with the IEEE 802.11 standard, is an example), WUSB, UWB, etc. All of these wireless mediums have features and advantages that make them appropriate for various applications.

Wireless communications devices incorporating some or all of the previously discussed features are powerful tools for increasing productivity. These single devices may be employed to accomplish tasks that once required a plurality of individual devices working together to complete. Telephone, email, instant messaging, Internet browsers, facsimile, audio and video recording, audio and video playback, word processing, scheduling, contact managers, conferencing tools and various other applications are all encompassed in one small package. A compact device size in this case is advantageous in terms of transporting the device, but this reduced size sometimes hampers the usability of the device, and will prompt a user to want to temporarily integrate other ancillary devices with the primary WCD to aid in the usability of the aforementioned applications and the productivity of the user.

An accessory device for a WCD originally required physical attachment for use, for example, a cable or wire. The limited amount of physical connection ports on a compact WCD restricted the use of these accessories to one or maybe two at a time, and necessarily entailed an entanglement of inconvenient wires. As the technology developed, wireless communication mediums like Bluetooth™ were developed as a replacement for these wires. Now a WCD could maintain an active connection with a plurality of satellite accessory devices without the physical constraints of communications cables or wires.

As communication technologies like Bluetooth™ mature, the applications for these types of short-range mediums continue to expand. Now, not only may a user have a plurality of remote accessory devices wirelessly connected to a WCD, but also active communications with other wireless communication devices like the encounter cellular handsets, of other users and wireless access points for distributing information may occur. As a result, a WCD may quickly become overwhelmed by the amount of simultaneous wireless activity being conducted over a certain medium, and therefore, performance will suffer for all transactions. The user may attempt to manually maintain the activity and connection status of all these devices, but current systems for connection management requires the use of cumbersome interfaces that somewhat defeat the advantages gained through the wireless communication.

Therefore, what is needed is a system to allow a user to simply manage the operational modes of various remote devices connected wirelessly to a WCD. This operational management should not require the manipulation of various configuration and control menus in the WCD and/or remote device, but instead should instantly allow a mode change in one or both devices depending on physical relationship between the devices, such as the proximity of the remote device to the WCD. The mode change should be acknowledged by the remote device and/or the WCD through some sort of audible or visual signal. The current mode of the remote device and/or WCD should be determinable by the mode change indicator.

SUMMARY OF INVENTION

The present invention is directed to a method, apparatus, system and computer program for controlling the operation of a remote device via wireless communication. The remote device includes resources for communication via at least two different short-range wireless mediums with different operational ranges. The sensing of a communication signal, such as a scanning signal, from a first wireless medium may change the operational mode of the remote device and/or the scanning device already in active communication over a second wireless medium. The mode change in one or both devices may be acknowledged by an indicator perceivable to the user of both devices, and the indicator should also be determinative of the current mode of each device.

In at least one embodiment of the present invention, the remote device is in active communication with a WCD via a second wireless medium. The user completes the current task requiring the remote device, and wishes to terminate the active connection with this accessory. The user may then move the remote devices within effective scanning range of a first wireless medium in the WCD, resulting in the scanning of a transponder in the remote device. As a result of this wireless transaction, the active connection between the two devices currently taking place over the second wireless medium may be terminated.

In further embodiments of the present invention, the mode of one or both of the remote device and the primary WCD changes as a result of the scanning transaction on the first wireless medium. Moving the remote device back into effective scanning range of the first wireless medium may result in further mode changes for one or both of the remote device and the primary WCD. Further, an audible, visible or tactile indicator may be triggered when the remote device and/or WCD change mode. This indicator may inform the device user of the success of the mode change, and also the current mode of one or both devices.

DESCRIPTION OF DRAWINGS

The invention will be further understood from the following detailed description of a preferred embodiment, taken in conjunction with appended drawings, in which:

FIG. 7 discloses a plurality of exemplary mode change transactions for one or both of a remote device communicating with a wireless communication device in accordance with at least one embodiment of the present invention.

FIG. 8A discloses a flow chart describing a wireless mode changes for one or both of a remote device communicating with a wireless communication device in accordance with at least one embodiment of the present invention.

DESCRIPTION OF PREFERRED EMBODIMENT

While the invention has been described in preferred embodiments, various changes can be made therein without departing from the spirit and scope of the invention, as described in the appended claims.

I. Wireless Communication Over Different Communication Networks.

Figure 1:
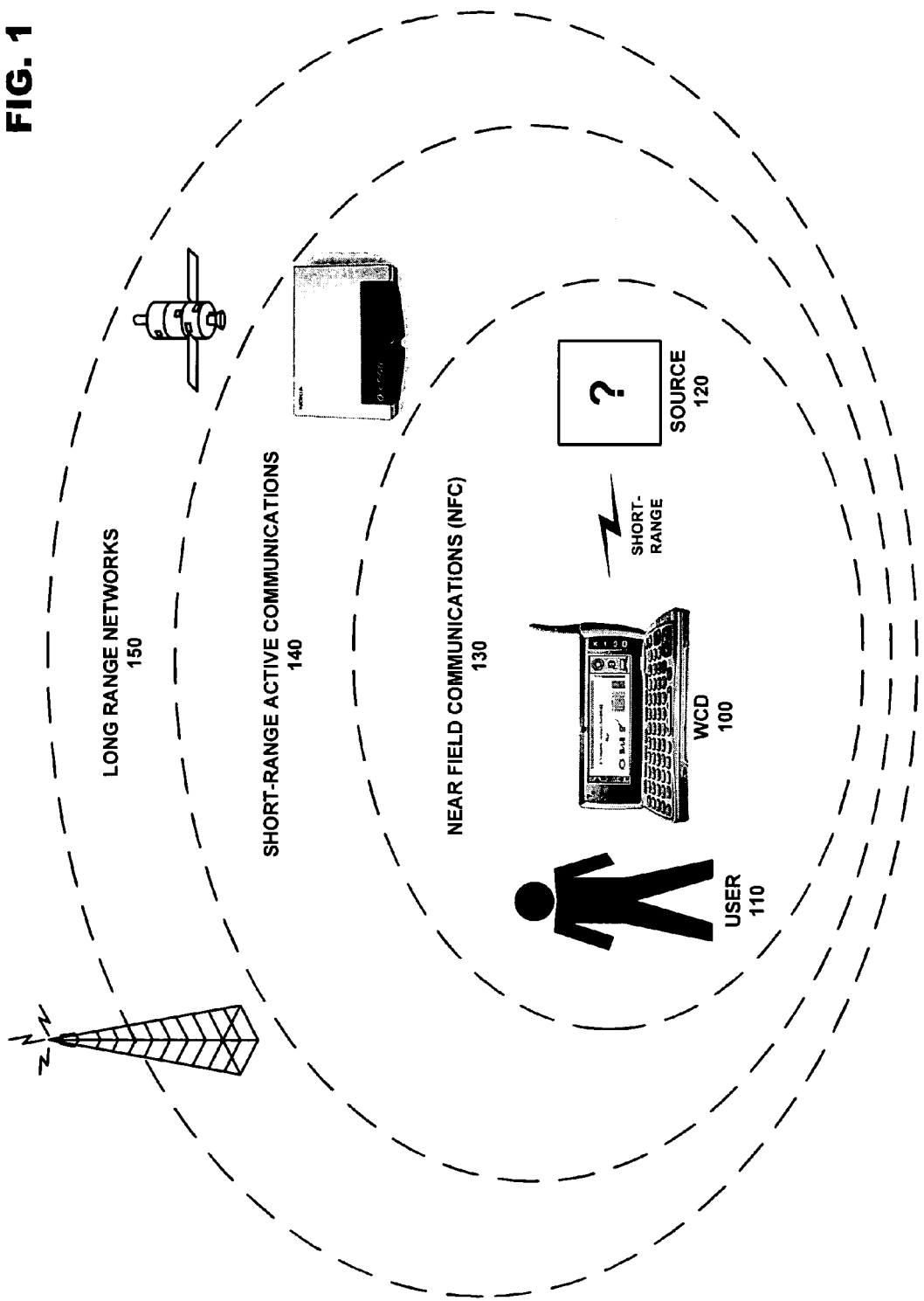
FIG. 1 discloses an exemplary short-range to long-range wireless communication environment usable to describe at least one embodiment of the present invention.

A WCD may both transmit and receive information over a wide array of wireless communication networks, each with different advantages regarding speed, range, quality (error correction), security (encoding), etc. These characteristics will dictate the amount of information that may be transferred to a receiving device, and the duration of the information transfer. FIG. 1 includes a diagram of a WCD and how it interacts with various types of wireless networks.

In the example pictured in FIG. 1, user 110 possesses WCD 100. This device may be anything from a basic cellular handset to a more complex device such as a wirelessly enabled palmtop or laptop computer. Near Field Communications (NFC) 130 include various transponder-type interactions wherein normally only the scanning device requires its own power source. WCD 100 scans source 120 via short-range communications. A transponder in source 120 may use the energy and/or clock signal contained within the scanning signal, as in the case of RFID communication, to respond with data stored in the transponder. These types of technologies usually have an effective transmission range of a few inches to a few feet, and may be able to deliver stored data in amounts from 96 bits to over a megabit (or 125 Kbytes) relatively quickly. These features make such technologies well suited for identification purposes, such as to receive an account number for a public transportation provider, a key code for an automatic electronic door lock, an account number for a credit or debit transaction, etc.

The transmission range between two devices may be extended if both devices are capable of performing powered communications. Short-range active communications 140 includes applications wherein the sending and receiving devices are both active. An exemplary situation would include user 110 coming within effective transmission range of a Bluetooth™ WLAN, UWB, WUSB, etc. access point. In the case of Bluetooth™, a network may automatically be established to transmit information to WCD 100 possessed by user 110. This data may include information of an informative, educational or entertaining nature. The amount of information to be conveyed is unlimited, except that it must all be transferred in the time when user 110 is within effective transmission range of the access point. This duration is extremely limited if the user is, for example, strolling through a shopping mall or walking down a street. Due to the higher complexity of these wireless networks, additional time is also required to establish the initial connection to WCD 100, which may be increased if there are many devices queued for service in the area proximate to the access point. The effective transmission range of these networks depends on the technology, and may be from 32 ft. to over 300 ft. with additional power boosting.

Long-range networks 150 are used to provide virtually uninterrupted communication coverage for WCD 100. Land-based radio stations or satellites are used to relay various communications transactions worldwide. While these systems are extremely functional, the use of these systems are often charged on a per-minute basis to user 110, not including additional charges for data transfer (e.g., wireless Internet access). Further, the regulations covering these systems cause additional overhead for both the users and providers, making the use of these systems more cumbersome.

II. Wireless Communication Device

As previously described, the present invention may be implemented using a variety of wireless communication equipment. Therefore, it is important to understand the communication tools available to user 110 before exploring the present invention. For example, in the case of a cellular telephone or other handheld wireless device, the integrated data handling capabilities of the device play an important role in facilitating transactions between the transmitting and receiving devices.

Figure 2:
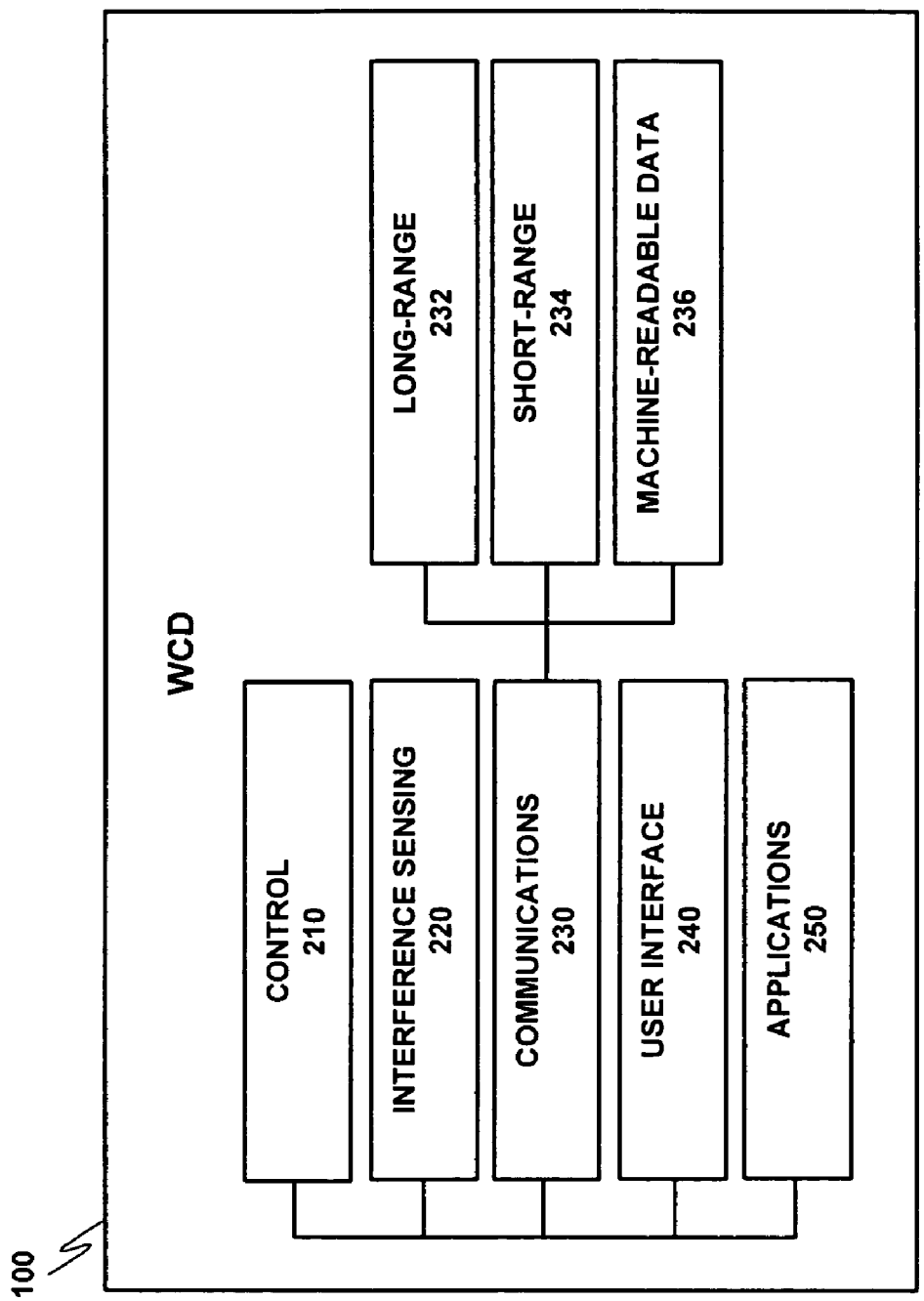
FIG. 2 discloses a modular description of an exemplary wireless communication device usable with at least one embodiment of the present invention.

FIG. 2 discloses an exemplary modular layout for a wireless communication device usable with the present invention. WCD 100 is broken down into modules representing the functional aspects of the device. These functions may be performed by the various combinations of software and/or hardware components discussed below.

Control module 210 regulates the operation of the device. Inputs may be received from various other modules included within WCD 100. For example, interference sensing module 220 may use various techniques known in the art to sense sources of environmental interference within the effective transmission range of the wireless communication device. Control module 210 interprets these data inputs, and in response, may issue control commands to the other modules in WCD 100.

Communications module 230 incorporates all of the communications aspects of WCD 100. As shown in FIG. 2, communications module 230 may include, for example, long-range communications module 232, short-range communications module 234 and machine-readable data module 236. Communications module 230 utilizes at least these sub-modules to receive a multitude of different types of communication from both local and long distance sources, and to transmit data to recipient devices within the broadcast range of WCD 100. Communications module 230 may be triggered by control module 210, or by control resources local to the module responding to sensed messages, environmental influences and/or other devices in proximity to WCD 100.

User interface module 240 includes visual, audible and tactile elements which allow the user 110 to receive data from, and enter data into, the device. The data entered by user 110 may be interpreted by control module 210 to affect the behavior of WCD 100. User-inputted data may also be transmitted by communications module 230 to other devices within effective transmission range. Other devices in transmission range may also send information to WCD 100 via communications module 230, and control module 210 may cause this information to be transferred to user interface module 240 for presentment to the user.

Applications module 250 incorporates all other hardware and/or software applications on WCD 100. These applications may include sensors, interfaces, utilities, interpreters, data applications, etc., and may be invoked by control module 210 to read information provided by the various modules and in turn supply information to requesting modules in WCD 100.

Figure 3:
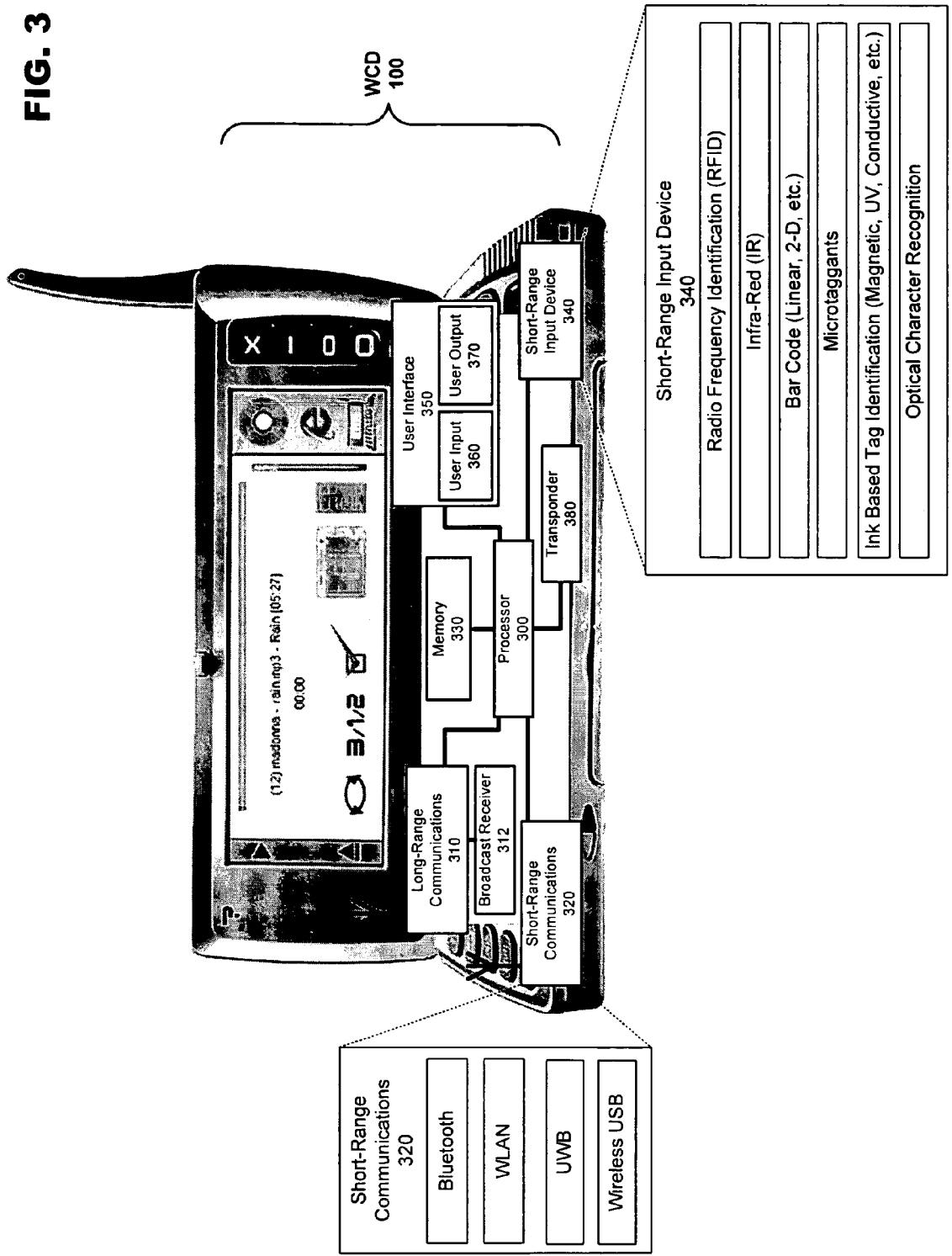
FIG. 3 discloses an exemplary structural description of the wireless communication device previously described in FIG. 2.

FIG. 3 discloses an exemplary structural layout of WCD 100 according to an embodiment of the present invention that may be used to implement the functionality of the modular system previously described in FIG. 2. Processor 300 controls overall device operation. As shown in FIG. 3, processor 300 is coupled to communications sections 310, 320 and 340. Processor 300 may be implemented with one or more microprocessors that are each capable of executing software instructions stored in memory 330.

Memory 330 may include random access memory (RAM), read only memory (ROM), and/or flash memory, and stores information in the form of data and software components (also referred to herein as modules). The data stored by memory 330 may be associated with particular software components. In addition, this data may be associated with databases, such as a bookmark database or a business database for scheduling, email, etc.

The software components stored by memory 330 include instructions that can be executed by processor 300. Various types of software components may be stored in memory 330. For instance, memory 330 may store software components that control the operation of communication sections 310, 320 and 340. Memory 330 may also store software components including a firewall, a service guide manager, a bookmark database, user interface manager, and any communications utilities modules required to support WCD 100.

Long-range communications 310 performs functions related to the exchange of information over large geographic areas (such as cellular networks) via an antenna. These communication methods include technologies from the previously described 1 G to 3G and soon fourth generation streaming video transmission. In addition to basic voice communications (e.g., via GSM), long-range communications 310 may operate to establish data communications sessions, such as General Packet Radio Service (GPRS) sessions and/or Universal Mobile Telecommunications System (UMTS) sessions. Also, long-range communications 310 may operate to transmit and receive messages, such as short messaging service (SMS) messages and/or multimedia messaging service (MMS) messages.

As a subset of long-range communications 310, or alternatively operating as an independent module separately connected to processor 300 (not pictured), broadcast receiver 312 allows WCD 100 to receive broadcast messages via mediums such as Digital Video Broadcast for Handheld Devices (DVB-H). These transmissions may be encoded so that only certain designated receiving devices may access the broadcast content, and may contain text, audio or video information. In at least one example, WCD 100 may receive these broadcasts and use information contained within the broadcast signal to determine if the device is permitted to view the received content.

Short-range communications 320 is responsible for functions involving the exchange of information across short-range wireless networks. As described above and depicted in FIG. 3, examples of such short-range communications 320 are not limited to Bluetooth™, WLAN, UWB and Wireless USB connections. Accordingly, short-range communications 320 performs functions related to the establishment of short-range connections, as well as processing related to the transmission and reception of information via such connections.

Short-range input device 340, also depicted in FIG. 3, may provide functionality related to the short-range scanning of machine-readable data. For example, processor 300 may control short-range input device 340 to generate RF signals for activating an RFID transponder, and may in turn control the reception of signals from an RFID transponder. Other short-range scanning methods for reading machine-readable data that may be supported by the short-range input device 340 are not limited to IR communications, linear and 2-D (e.g., QR) bar code readers (including processes related to interpreting UPC labels), and optical character recognition devices for reading magnetic, UV, conductive or other types of coded data that may be provided in a tag using suitable ink. In order for the short-range input device 340 to scan the aforementioned types of machine-readable data, the input device may include optical detectors, magnetic detectors, CCDs or other sensors known in the art for interpreting machine-readable information.

As further shown in FIG. 3, user interface 350 is also coupled to processor 300. User interface 350 facilitates the exchange of information with a user. FIG. 3 shows that user interface 350 includes a user input 360 and a user output 370. User input 360 may include one or more components that allow a user to input information. Examples of such components include keypads, touch screens, and microphones. User output 370 allows a user to receive information from the device. Thus, user output portion 370 may include various components, such as a display, light emitting diodes (LED), tactile emitters and one or more audio speakers. Exemplary displays include liquid crystal displays (LCDs), and other video displays.

WCD 100 may also include one or more transponders 380. This is essentially a passive device which may be programmed by processor 300 with information to be delivered in response to a scan from an outside source. For example, an RFID scanner mounted in a entryway may continuously emit radio frequency waves. When a person with a device containing transponder 380 walks through the door, the transponder is energized and may respond with information identifying the device, the person, etc.

Hardware corresponding to communications sections 310, 312, 320 and 340 provide for the transmission and reception of signals. Accordingly, these portions may include components (e.g., electronics) that perform functions, such as modulation, demodulation, amplification, and filtering. These portions may be locally controlled, or controlled by processor 300 in accordance with software communications components stored in memory 330.

The elements shown in FIG. 3 may be constituted and coupled according to various techniques in order to produce the functionality described in FIG. 2. One such technique involves coupling separate hardware components corresponding to processor 300, communications sections 310, 312 and 320, memory 330, short-range input device 340, user interface 350, transponder 380, etc. through one or more bus interfaces. Alternatively, any and/or all of the individual components may be replaced by an integrated circuit in the form of a programmable logic device, gate array, ASIC, multi-chip module, etc. programmed to replicate the functions of the stand-alone devices. In addition, each of these components is coupled to a power source, such as a removable and/or rechargeable battery (not shown).

The user interface 350 may interact with a communications utilities software component, also contained in memory 330, which provides for the establishment of service sessions using long-range communications 310 and/or short-range communications 320. The communications utilities component may include various routines that allow the reception of services from remote devices according to mediums such as the Wireless Application Medium (WAP), Hypertext Markup Language (HTML) variants like Compact HTML (CHTML), etc.

When engaging in WAP communications with a remote server, the device functions as a WAP client. To provide this functionality, the software components may include WAP client software components, such as a Wireless Markup Language (WML) Browser, a WMLScript engine, a Push Subsystem, and a Wireless Medium Stack.

Applications (not shown) may interact with the WAP client software to provide a variety of communications services. Examples of such communications services include the reception of Internet-based content, such as headline news, exchange rates, sports results, stock quotes, weather forecasts, multilingual phrase dictionaries, shopping and dining information, local transit (e.g., bus, train, and/or subway) schedules, personal online calendars, and online travel and banking services.

The WAP-enabled device may access small files called decks which each include smaller pages called cards. Cards are small enough to fit into a small display area that is referred to herein as a microbrowser. The small size of the microbrowser and the small file sizes are suitable for accommodating low memory devices and low-bandwidth communications constraints imposed by wireless links.

Cards are written in the Wireless Markup Language (WML), which is specifically devised for small screens and one-hand navigation without a keyboard. WML is scaleable so that it is compatible with a wide range of displays that covers two-line text displays, as well as large LCD screens found on devices, such as smart phones, PDAs, and personal communicators. WML cards may include programs written in WMLScript, which is similar to JavaScript. However, through the elimination of several unnecessary functions found in these other scripting languages, WMLScript reduces memory and processing demands.

CHTML is a subset of the standard HTML command set adapted for use with small computing devices (e.g., mobile communicator, PDA, etc.). This language allows portable or handheld devices interact more freely on the Internet. CHTML takes into consideration the power, processing, memory and display limitations of small computing devices by stripping down standard HTML to a streamlined version suitable for these constraints. For example, many of the more advanced image maps, backgrounds, fonts, frames, and support for JPEG images have been eliminated. Further, scrolling is not supported because it is assumed that CHTML displays will fit within the screen of a portable device. CHTML has also been designed to operated without two dimensional cursor movement. Instead, it may be manipulated with only four buttons, which facilitates its implementation over a larger category of small computing devices.

III. Remote Devices

Figure 4:
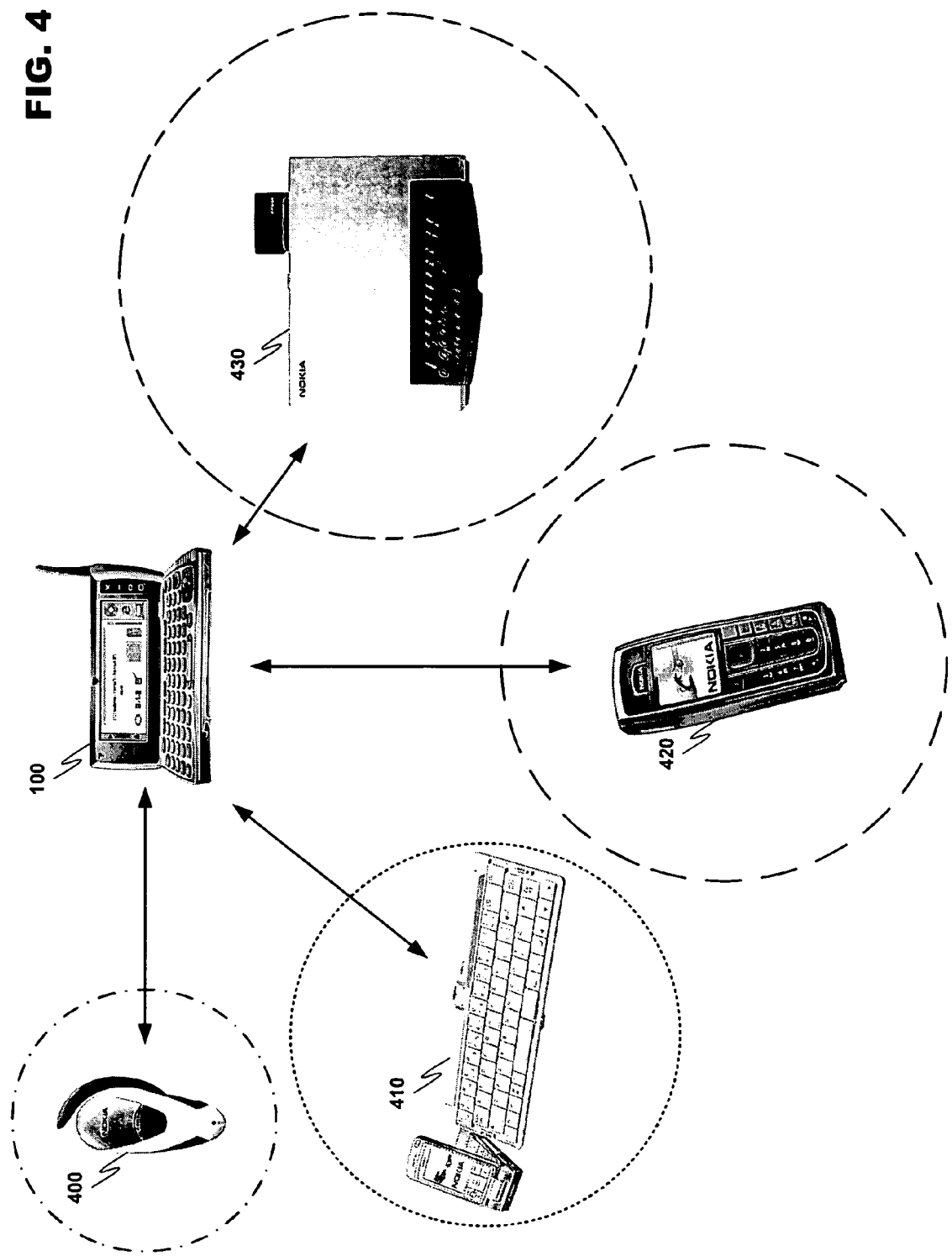
FIG. 4 discloses exemplary remote devices that may operate via the same wireless medium to communicate with a wireless communication device in accordance with at least one embodiment of the present invention.

FIG. 4 discloses various other wireless devices, or remote devices, usable with the instant invention. WCD 100 may interact with one or more remote devices, individually or simultaneously. Items 400 and 410 in FIG. 4 are examples of accessories that are usable in conjunction with WCD 100 to increase the productivity of user 110. Headset 400 may be used to communicate voice information from user 110 to WCD 100, for instance, during a telephone call. This remote device may have a very short transmission range (represented by the small dashed circle surrounding Headset 400) because of the compact nature of the device, and given that the remote device will presumably be worn by user 110 while WCD 100 is also on their person (held, clipped on a belt, contained in a pocket, etc.). Keyboard 410 has slightly longer range. This remote device may used with WCD 100 as a user interface device for typing information into a email program, schedule, word processor, etc. It is important to note that Headset 400 and Keyboard 410 may be used together to operate WCD 100. If both devices operate using Bluetooth™, then WCD 100 may serve as master to create a piconet including both remote devices. In this way, user 110 may simultaneously talk on the phone and type notes concerning the telephone call. Headset 400 and keyboard 410 are just two examples of a myriad of accessory remote devices that may be used with WCD 100.

Items 420 and 430 may also communicate with WCD 100 using a communication medium like Bluetooth™. Cellular telephone 420 may contact, or be contacted by, WCD 100 in order to form a piconet, wherein either device may be the master. The two devices may then exchange information such as business or home contact information, advertisement information, ticketing information, etc. Service point 430 may be set up to do a similar function for municipal, commercial, educational or personal use. Service point 430 may, in some cases, be located in an area frequented by pedestrians, like a shopping mall, or installed on public transportation. The various users that come within transmission range of service point 430 may be automatically contacted in order to receive information on public transportation schedules, notification of special events, sales or offers, restaurant menus, etc. User 110 may establish filters in WCD 100 to permit certain information to be saved for viewing at a later time. Similar to remote devices 400 and 410, the increasing size of the circle surround each device indicates that the relative effective transmission area of each device is increasing from left to right. In the case of service point 430, users may be contacted as soon as they come within a 10-20 feet of the device. This extended range may be necessary because user 110 may only remain within transmission range of service point 430 for a short period of time.

The devices disclosed in FIG. 4 are presented for the sake of example only, and should not be considered as limiting regarding the various embodiments of the present invention. Any electronic device capable of wireless communication using a compatible wireless medium may interact with, or possibly be controlled by, WCD 100. Examples of the array of electronic devices now being produced that include this wireless communication capability include digital cameras, portable media players, televisions, video and DVD players having short-range wireless connectivity.

Figure 5:
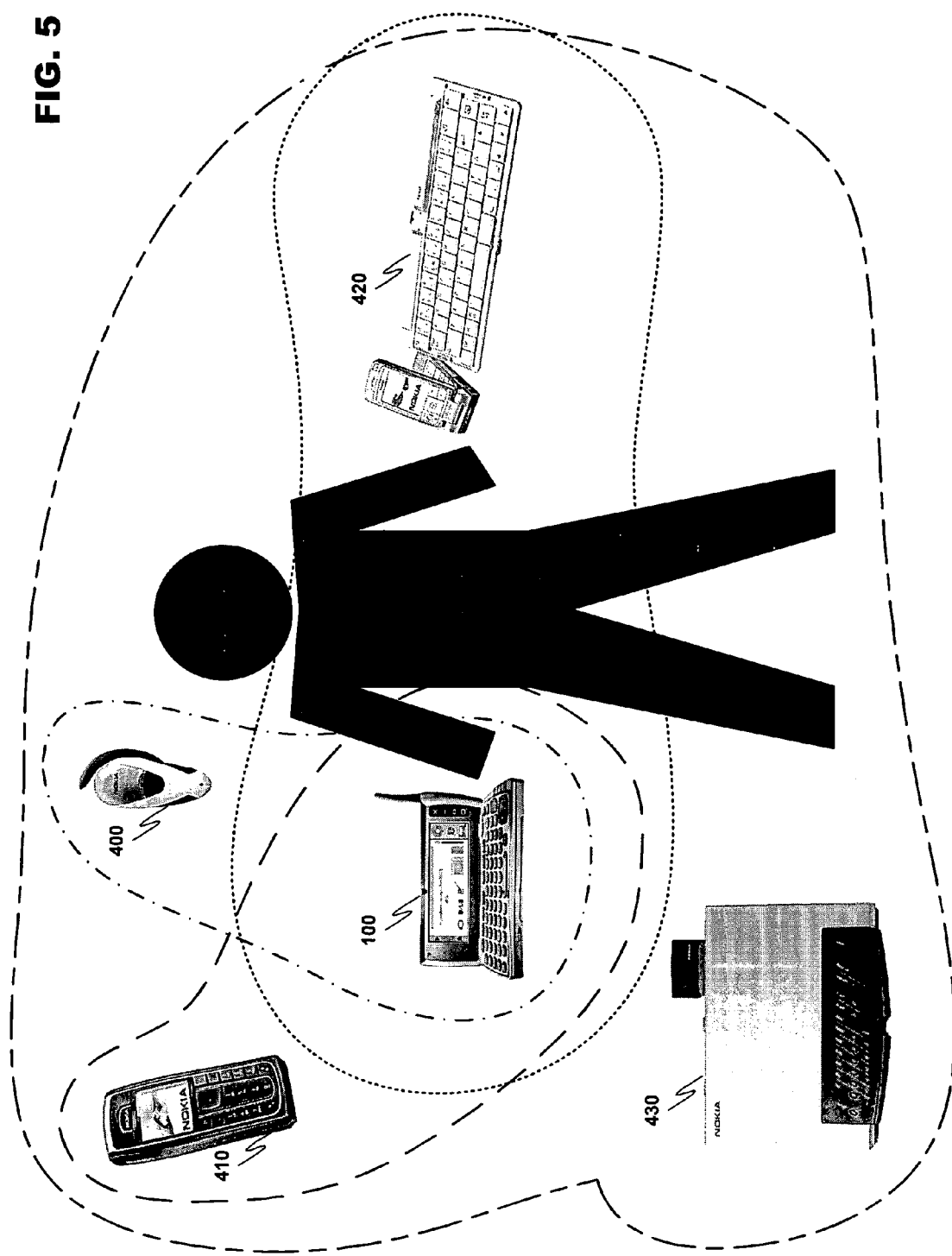
FIG. 5 discloses all of the exemplary remote devices previously described FIG. 4 attempting to simultaneously communicate with a wireless communication device via the same wireless medium in accordance with at least one embodiment of the present invention.

FIG. 5 shows a situation wherein all of the remote devices described in FIG. 4 attempt to interact with WCD 100 all at the same time. The amount of "activity" depicted in this figure demonstrates the potential delay problems that may be encounter with a large number of active remote devices. As master device, WCD 100 must partition the available transactional bandwidth up between all of these devices, and therefore, overall system performance may be slower. Slow performance will detrimentally affect the behavior of all slave devices. Audio transmission/reception may become broken or delayed, keystrokes may be dropped, data transmission times to and from the various remote devices may become extended, and therefore, a full upload/download may not be able to be completed in the time allowed.

One way to prevent these problems from happening is to disconnect remote devices that are not currently participating in active communication with WCD 100. An obvious way to do this is to power off the remote device. However, user 110 may not want to deactivate a remote device because use of this device is anticipated in the near future. Traditional ways of removing a device from a piconet without powering it off involve a user entering a configuration process with one or both devices involved in the piconet to manually indicate disconnecting the remote device. This process may involve traversing multiple configuration screens in order to get to the correct control identifier, which is an exercise undesirable to the user. The present invention, as will be described, may achieve the goal of manually removing a device from a piconet without having to power down the device in a quick and straightforward method.

IV. Control Implemented Using at Least Two Wireless Communication Mediums

Figure 6:
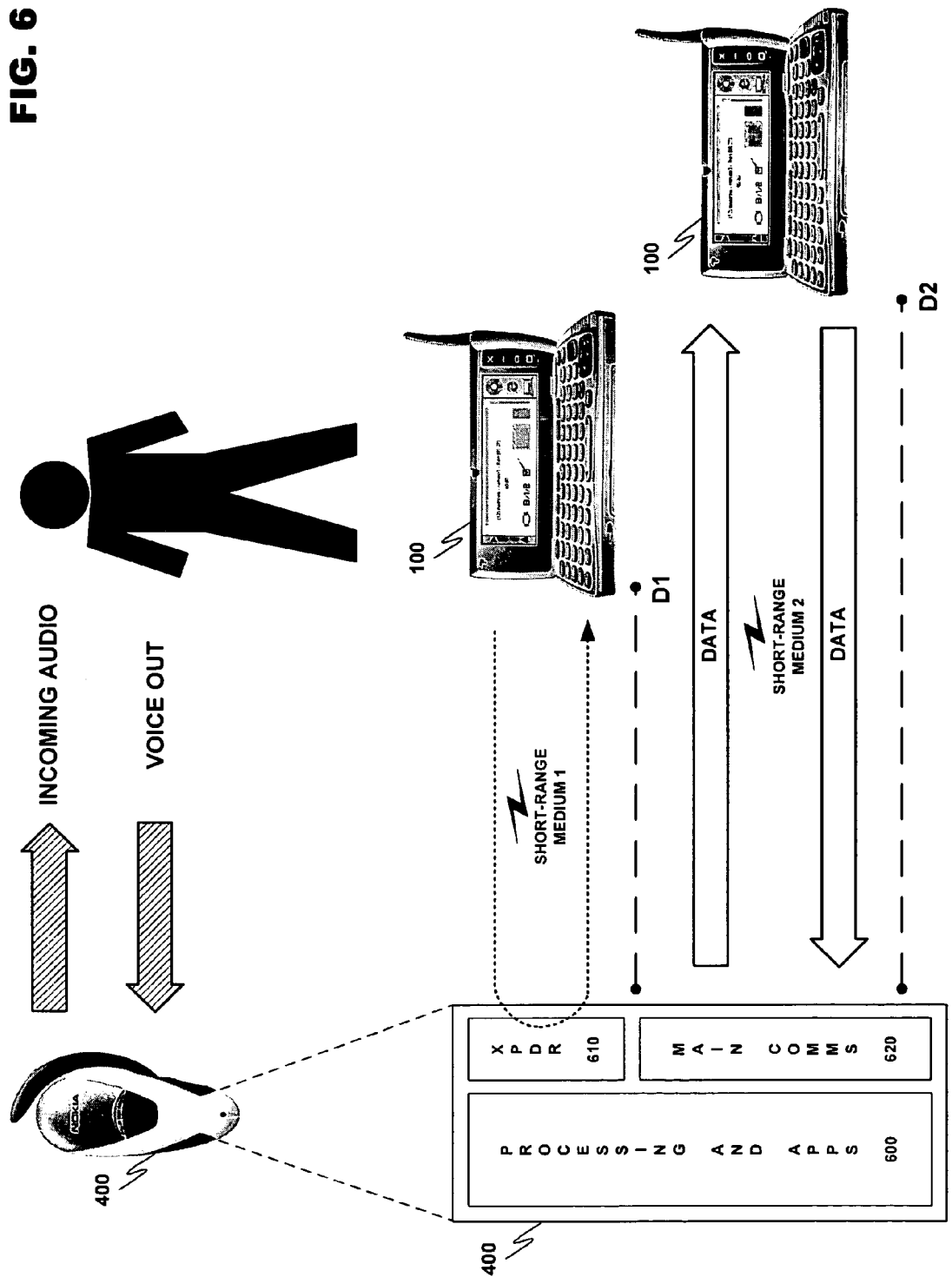
FIG. 6 discloses an exemplary transactional diagram showing a remote device wirelessly communicating with a wireless communication device using at least two wireless mediums in accordance with at least one embodiment of the present invention.

FIG. 6 discloses a process associated with at least one embodiment of the present invention. Headset 400 is further exhibited as a schematic diagram including processing and apps section 600, transponder 610 and main communications 620. Headset 400 is worn by user 110 when engaged in a telephone conversation, making a dictation, etc. Processing and apps section 600 receives voice out audio input from user 110 and processes (e.g., prepares, converts, compresses, etc.) this information for transmission to WCD 100. Processing and apps section 600 may contain any combination of hardware and/or software required to perform these functions. The information is then sent using main communications section 620 to WCD 100. Conversely, wireless information may be sent by WCD 100 to headset 400 through main communications 620. This information may be processed by processing and apps section 600 into audio information. User 110 is then able to listen to this incoming audio.

As previously described, WCD 100 may contain hardware and/or software for scanning machine-readable information over short distances. In the example disclosed in FIG. 6, Headset 400 includes transponder 610. At a short distance (indicated as D1 in the FIG. 6) WCD 100 may scan headpiece 400 in order to read information from transponder 610. This scan may utilize a short-range communication medium like IR or RFID indicated as "medium 1." The short distance scan may trigger two effects. Initially, the scan may be detected by headpiece 400 in terms of, for instance, a voltage or current induced in the antenna coil of transponder 610. Headpiece 400 may use the detection of these induced properties as a trigger for further actions, for instance, to trigger a mode change. Further, the scan using wireless medium 1 may cause transponder 620 to deliver information back to WCD 100, such as identification information related to the headpiece device (e.g., a BD_ADDR, or Bluetooth™ ID).

It is important to note that the distance D1 indicated in FIG. 6 is shorter than distance D2. The second wireless medium ("medium 2") may be one of the short-range active wireless mediums described in FIG. 1, such as Bluetooth™. Medium 2 has a significantly longer range than medium 1, which results in a user having to move a remote device, like headset 400, closer to WCD 100 in order to be in transmission range of medium 1, as opposed to the normal effective operating range of medium 2.

V. Examples of Device Control

FIG. 7 discloses a plurality of example applications in accordance with the embodiments of the present invention. In each of these applications, the mode of a remote device, and possibly also the scanning device, is altered due to the short-range scanning of a machine-readable transponder located in the remote device. For instance, example 700 may be employed when user 110 finishes a telephone conversation, and desires to disconnect Bluetooth™ headset 400 from the piconet actively being maintained by WCD 100. Headset 400 may be moved from a position within transmission distance of the Bluetooth connection (example of medium 2 from FIG. 6) to within scanning range of an RFID reader in WCD 100 (example of medium 1 from FIG. 6). WCD 100 reads the transponder 610 in headset 400, and as a result, headset 400 is disconnected from the piconet by the master WCD 100.

Further, mode changes may occur due to reactions by both headset 400 and WCD 100. Headset 400 may sense an induced voltage or current in the antenna coil of transponder 610, and this sensed voltage or current may in turn trigger a mode change such as switching from an active communication mode to an available/receiving mode, switching from a fully operational mode to a power saving mode, etc. In a second triggered reaction, the short-range scanning of the machine-readable transponder by WCD 100 may return an identification, such as a Bluetooth™ ID, that allows WCD 100 to remove headset 400 from active participation in the piconet. The mode change in one or both devices may be acknowledged to the user through a audible, visible or tactile signal. In the disclosed example, an audible "beep!" is sounded indicating that the mode of the remote device has changed. Other indicators include an LED flash for visible indication, a vibration, etc. The removal of headset 400 will release allocated resources in WCD 100 to allow the connection of another device, or to reallocate additional bandwidth to a task already in process (e.g., downloading information from another wireless device or access point). WCD 100 may also record the identification of the disconnected remote device so that a reconnection to the device may be established quickly in the event of another required use, like a telephone call.

Example 710 may occur subsequent to the example depicted in 700. User 110 may further decide that they do not want to receive incoming calls on headset 400, or may desire to hide headset 400 from all polling master devices in the area. In a process similar to 700, user 110 may move headset 400 closer to WCD 100 so that it may be scanned. Again a mode change may occur in one or both of the transacting devices. In example 710, the induced voltage or current trigger previously described may be used to change the mode of headset 400 so that it is hidden from all polling master devices within transmission range (i.e., the headset does not respond to polling inquiries). WCD 100 may also again receive a remote device ID as a result of scanning headset 400, and may record this number to indicate that this device should not be contacted for an incoming call, should not be contacted for an outgoing call, should be contacted only under certain conditions, such as an incoming business call, a call from a certain source telephone number, an emergency call, etc. These changes in device mode are acknowledged to user 110 through audible, visible or tactile indication. In the disclosed example, two beeps indicate that headset 400 is now in a mode that masks or hides it's presence from WCD 100.

The change from a current mode to a subsequent mode in either device may be based on a variety of factors. For less complex remote devices, like headset 400, the mode change may be based on the previous operational mode. In this way, modes may proceed in a preset progression from one to another, eventually resetting to the original mode. In more complex devices, a similar mode change algorithm may be paired with or replaced with the sensing of environmental and/or device-related variables that are used to determine the appropriate next mode for the device. For example, a remote device may sense a time of day, a date, a location, the number of other devices in transmission range, a power level, an amount of free memory space, etc. The remote device may use these sensed conditions as inputs to an algorithm that determines the next most-appropriate operating mode.

Further, these same device management strategies may be used to automatically control WCD 100. For example, If user 110 is actively talking on a telephone call, and headset 400 is in a position that causes it to be inadvertently scanned, headset 400 might accidentally be dropped from the piconet and the telephone call disconnected. However, a safeguard might be made in WCD 100 to consider whether a telephone call is actively connected when headset 400 is scanned to avoid accidentally disconnecting headset 400 in this scenario. These reactions to sensed input may be programmed by the manufacturer as default settings that may later be modified by user 110 through various menu driven interfaces that are well known in the art. Alterations in default settings may be required to account for the functionality of certain remote devices, or to account for certain applications involving both remote devices and WCD 100.

In the third example 720, headset 400 is again scanned by WCD 100 after it has already entered the hidden mode previously described. In this case, the sensed voltage or current in the antenna of transponder 610 may trigger headset 400 to power down. A long "beep!" or other indicator may demonstrate to user 110 that the remote device is about to power down. This mode could also be triggered by the sustained presence of the remote device within scanning range of WCD 100, regardless of the previous mode. WCD 100 may again read the remote ID contained in transponder 610, and may record that the remote device has been powered down so as to avoid expending resources in trying to connect to the remote device again. Other alternative modes, not pictured, could include the unhiding of the remote device for use by WCD 100, the active connection of the remote device to WCD 100, etc.

FIG. 8A discloses a basic flow chart of a process in accordance with at least one embodiment of the present invention. An active data exchange is already progressing in step 800 of this process. The data exchange may be with any of the aforementioned exemplary remote devices. In step 802, the status of the data exchange is verified. If the data exchange continues to be active, we return to step 800 via step 806. However, if the data exchange has completed, user 110 may decide to manually intervene. In step 804, user 110 holds the remote device in close proximity to WCD 110, or vice versa, so that the remote device may be scanned. The remote device is disengaged, and an audible signal then indicates that the active connection between the remote device and WCD 100 has been severed (step 808). User 110, however, depending on the situation, may need to further alter the mode of one or both of the wireless devices. User 110 may again hold the devices in close proximity in step 820 to perpetuate scanning via short-range machine-readable medium 1, which in turn reads the transponder in the remote device and triggers a mode change in one or both devices. In step 822, the mode of one or both devices change, and an audible signal indicates the new mode of one or both devices. If no additional mode changes are required, then the devices enter mode specific operation (depending on their current mode) in step 814, until a new connection inquiry may result in the devices again entering active communications (step 822 linking through "A" back to step 800).

Figure 8B:
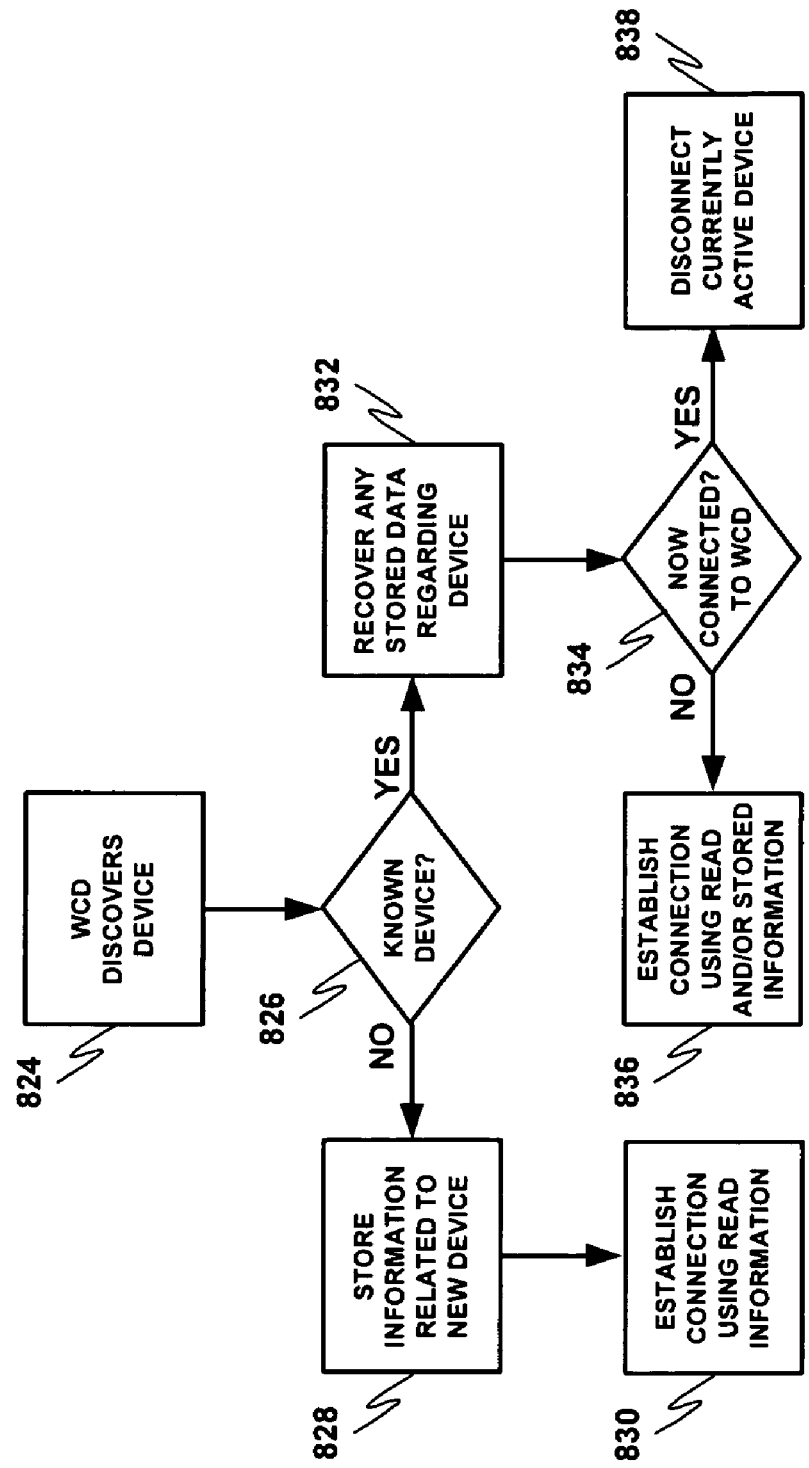
FIG. 8B discloses a flow chart describing an overall interaction between a wireless communication device and a newly discovered remote device in accordance with at least one embodiment of the present invention.

A more inclusive encounter between a remote device and WCD 100, in accordance with at least one embodiment of the present invention, is disclosed in FIG. 8B. WCD 100 encounters a remote device through a scanning operation using wireless medium 1 (step 824). For example, WCD 100 may discover the remote device through the scanning of an imbedded RFID transponder. As a result of the scan, WCD 100 receives information returned from the remote device regarding an identification (e.g., Bluetooth™ address or BD_ADDR). In step 826, WCD 100 determines whether the remote device has been encountered before based on the identification information. If the discovered remote device was previously unknown (e.g., no stored information related to the BD_ADDR), WCD 100 may store this new identification information and attempt to establish an active connection over wireless medium 2 (e.g., Bluetooth™) in steps 828 and 830. Alternatively, information for the encountered device is recovered from memory and the current state of remote device connection via wireless medium 2 is determined in step 832. If the device is not currently connected, WCD 100 may attempt to reconnect to the remote device using the recently read and/or stored information (step 836). Otherwise, an actively connected device may be disconnected from WCD 100 using a procedure such as the one previously described in FIG. 8A.

The present invention is an improvement over existing systems because it automates a control process that would otherwise require substantial configuration, management and possible manual intervention on behalf of a device user. A user merely has to move a remote device within scanning proximity of a wireless communication device in order to effect a mode change in one or both devices. The user may then be notified of a mode change in one or both devices via a multitude of audible, visual or tactile manners, allowing the user to know the current mode of each device, and whether additional mode changes are required. All of this management is simply driven by the proximity of one device to another, allowing simple device controllability, for example, when a user is busy multitasking various operations and tasks simultaneously on a daily basis.

Accordingly, it will be apparent to persons skilled in the relevant art that various changes in form a and detail can be made therein without departing from the spirit and scope of the invention. The breadth and scope of the present invention should not be limited by any of the above-described exemplary embodiments, but should be defined only in accordance with the following claims and their equivalents.

The invention claimed is:

1. A method, comprising:
   receiving, at a first device that is wirelessly connected to a second device via a wireless communication connection, a radio frequency identification scan that induces a voltage and/or current in an antenna located in the first device;
   using the induced voltage and/or current to transmit identification information corresponding to the first device to the second device in response to the radio frequency identification scan; and
   triggering the first device to terminate the wireless connection in response to receiving the radio frequency identification scan;
   wherein receiving a second radio frequency identification scan from the second device causes the first device to establish a new wireless connection via the wireless communication connection.

2. The method of claim 1, wherein the wireless connection is a Bluetooth™ piconet.

3. The method of claim 1, wherein the antenna is connected to a radio frequency identification module.

4. The method of claim 3, wherein the radio frequency identification module is a transponder.

5. The method of claim 1, wherein the second device uses the identification information to terminate the wireless connection to the first device.

6. The method of claim 1, wherein an audible, visible or tactile indicator is activated to confirm communication connection changes in the first device.

7. The method of claim 1, wherein transmission range for the wireless communication connection is substantially greater than transmission range for radio frequency identification.

8. The method of claim 1, wherein the radio frequency identification scan comprises a Near Field Communication scan.

9. A method, comprising:
   sensing a first device by receiving identification information corresponding to the first device at a second device in response to a radio frequency identification scan performed by the second device;
   determining whether the first device is already wirelessly connected via a wireless communications connection to the second device based on the received identification information;
   if it is determined that the first device is not already wirelessly connected to the second device, triggering connection establishment for establishing a wireless communication connection in the second device; and
   if it is determined that the first device is already wirelessly connected to the second device, triggering the second device to terminate the existing wireless connection with the first device.

10. The method of claim 9, wherein the wireless connection is a Bluetooth™ piconet.

11. The method of claim 9, wherein an audible, visible or tactile indicator is activated to confirm communication connection changes in the second device.

12. The method of claim 9, wherein transmission range for the wireless communication connection is substantially greater than transmission range for radio frequency identification.

13. The method of claim 9, wherein the radio frequency identification scan comprises a Near Field Communication scan.

14. A device comprising:
   a first communication module comprising at least a transponder and an antenna configured to receive a radio frequency identification scan and to utilize voltage and/or current induced in the antenna of the transponder to respond to the radio frequency identification scan with identification information for the device, the identification information corresponding to a wireless connection via a wireless communication connection in which the device is already engaged;
   a sensory module configured to detect the voltage and/or current induced in the first communication module;
   a second communication module configured to communicate via the wireless communication connection; and
   a computing device configured to trigger the device to terminate participation in the wireless connection;
   wherein receiving a second radio frequency identification scan causes the first communication module to establish a new wireless connection via the wireless communication connection.

15. The device of claim 14, wherein the wireless connection is a Bluetooth™ piconet.

16. The device of claim 14, wherein an audible, visible or tactile indicator is activated to confirm communication connection changes in the device.

17. The device of claim 14, wherein transmission range for the wireless communication connection is substantially greater than transmission range for radio frequency identification.

18. The device of claim 14, wherein the radio frequency identification scan comprises a Near Field Communication scan.

19. A device, comprising:
a radio frequency identification reader configured to transmit a scanning signal and to receive information identifying a first device;
a wireless transceiver configured to communicate via a wireless communication connection; and
a computing device configured to determine whether the first device is already wirelessly connected via the wireless communication connection to the device based on the received identification information, to trigger a connection establishment process via the wireless communication connection in the device if it is determined that the first device is not already wirelessly connected to the device, and to trigger the device to terminate the wireless connection if it is determined that the first device is already wirelessly connected to the device.

20. The device of claim 19, wherein the wireless connection is a Bluetooth™ piconet.

21. The device of claim 19, wherein an audible, visible or tactile indicator is activated to confirm communication connection changes in the device.

22. The device of claim 19, wherein transmission range for the wireless communication connection is substantially greater than transmission range for radio frequency identification.

23. The device of claim 19, wherein the radio frequency identification scan comprises a Near Field Communication scan.

24. A computer program product comprising computer executable program code recorded on a non-transient computer-readable storage medium, the computer executable program code comprising:
code for receiving, at a first device that is wirelessly connected to a second device via a wireless communication connection, a radio frequency identification scan that induces a voltage and/or current in an antenna located in the first device;
code for using the induced voltage and/or current to transmit identification information corresponding to the first device to the second device in response to the radio frequency identification scan; and
code for triggering the first device to terminate the wireless connection in response to receiving the radio frequency identification scan;
wherein code for receiving a second radio frequency identification scan from the second device causes the first device to establish a new wireless connection via the wireless communication connection.

25. The computer program product of claim 24, wherein the wireless connection is a Bluetooth™ piconet.

26. The computer program product of claim 24, wherein the antenna is connected to a radio frequency identification module.

27. The computer program product of claim 26, wherein the radio frequency identification module is a transponder.

28. The computer program product of claim 24, wherein the second device uses the identification information to terminate the wireless connection to the first device.

29. The computer program product of claim 24, wherein an audible, visible or tactile indicator is activated to confirm communication connection changes in the first device.

30. The computer program product of claim 24, wherein transmission range for the wireless communication connection is substantially greater than transmission range for radio frequency identification.

31. The computer program product of claim 24, wherein the radio frequency identification scan comprises a Near Field Communication scan.

32. A computer program product comprising computer executable program code recorded on a non-transient computer readable storage medium, the computer executable program code comprising:
code for sensing a first device by receiving identification information corresponding to the first device at a second device in response to a radio frequency identification scan performed by the second device;
code for determining whether the first device is already wirelessly connected via a wireless communication connection to the second device based on the received identification information;
code for, if it is determined that the first device is not already wirelessly connected to the second device, triggering connection establishment via the wireless communication connection in the second device; and
code for, if it is determined that the first device is already wirelessly connected to the second device, triggering the second device to terminate the wireless connection.

33. The computer program product of claim 32, wherein the wireless connection is a Bluetooth™ piconet.

34. The computer program product of claim 32, wherein an audible, visible or tactile indicator is activated to confirm communication connection changes in the second device.

35. The computer program product of claim 32, wherein transmission range for the wireless communication connection is substantially greater than transmission range for radio frequency identification.

36. The computer program product of claim 32, wherein the radio frequency identification scan comprises a Near Field Communication scan.

37. A system, comprising:
a first device;
a second device;
the second device being wirelessly connected to the first device via a wireless communication connection, and further performing a radio frequency identification scan of the first device;
the first device sensing the radio frequency identification scan from the second device through a voltage and/or current induced in the antenna of a transponder located within the first device, using the induced voltage and/or current to respond to the radio frequency identification scan, terminating participation in the wireless connection;
the second device receiving, from the transponder of the first device, identification information for the first device corresponding to the wireless connection, the second device terminating the wireless network in response to the receipt of the identification information;
wherein receiving a second radio frequency identification scan from the second device causes the first device to establish a new wireless connection via the wireless communication connection.

38. The system of claim 37, wherein the wireless connection is a Bluetooth™ piconet.

39. The system of claim 37, wherein transmission range for the wireless communication connection is substantially greater than transmission range for radio frequency identification.

40. The system of claim 37, wherein the radio frequency identification scan comprises a Near Field Communication scan.

* * * * *

UNITED STATES PATENT AND TRADEMARK OFFICE
CERTIFICATE OF CORRECTION

| | | |
|---|---|---|
| PATENT NO. | : 8,374,548 B2 | Page 1 of 1 |
| APPLICATION NO. | : 11/312773 | |
| DATED | : February 12, 2013 | |
| INVENTOR(S) | : Jukka Parkkinen | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1507 days.

Signed and Sealed this
Twenty-eighth Day of October, 2014

Michelle K. Lee
*Deputy Director of the United States Patent and Trademark Office*